United States Patent [19]
Kreitzberg

[11] 4,083,266
[45] Apr. 11, 1978

[54] POWER SHIFT TRANSMISSION WITH REPLACEABLE CONTROL UNIT

[75] Inventor: Ernest A. Kreitzberg, Mukwonago, Wis.

[73] Assignee: Allis-Chalmers Corporation, Milwaukee, Wis.

[21] Appl. No.: 711,106

[22] Filed: Aug. 2, 1976

[51] Int. Cl.² .......................... F16H 57/02; F16H 5/06
[52] U.S. Cl. .................................. 74/606 R; 74/337.5
[58] Field of Search ..................... 74/606 R, 336, 337, 74/337.5

[56] References Cited
U.S. PATENT DOCUMENTS

| | | | |
|---|---|---|---|
| 2,699,841 | 1/1955 | Gunderson | 74/606 X |
| 2,729,519 | 1/1956 | Bottenhorn | 74/606 X |
| 3,053,115 | 9/1962 | Cartwright et al. | 74/606 X |
| 3,062,060 | 11/1962 | Hoenick et al. | 74/606 X |
| 3,347,341 | 10/1967 | Avrea | 74/606 X |
| 3,613,481 | 10/1971 | Lapinski | 74/606 R X |
| 3,884,098 | 5/1975 | Gumpoltsberger | 74/606 R X |

*Primary Examiner*—Samuel Scott
*Assistant Examiner*—Lance W. Chandler
*Attorney, Agent, or Firm*—Arthur L. Nelson

[57] ABSTRACT

A power shift transmission mounted within the transmission housing and a hydraulic system for operating the transmission. The housing has an opening for receiving a transmission control unit. The opening provides an inspection window when the control unit is removed. The transmission and control unit are equipped with internal plumbing and a provision for automatic coupling of the control unit with the transmission when it is assembled on a transmission housing. The control unit is constructed such that it can be replaced by an identical unit for convenience in servicing with a minimum of downtime.

10 Claims, 11 Drawing Figures

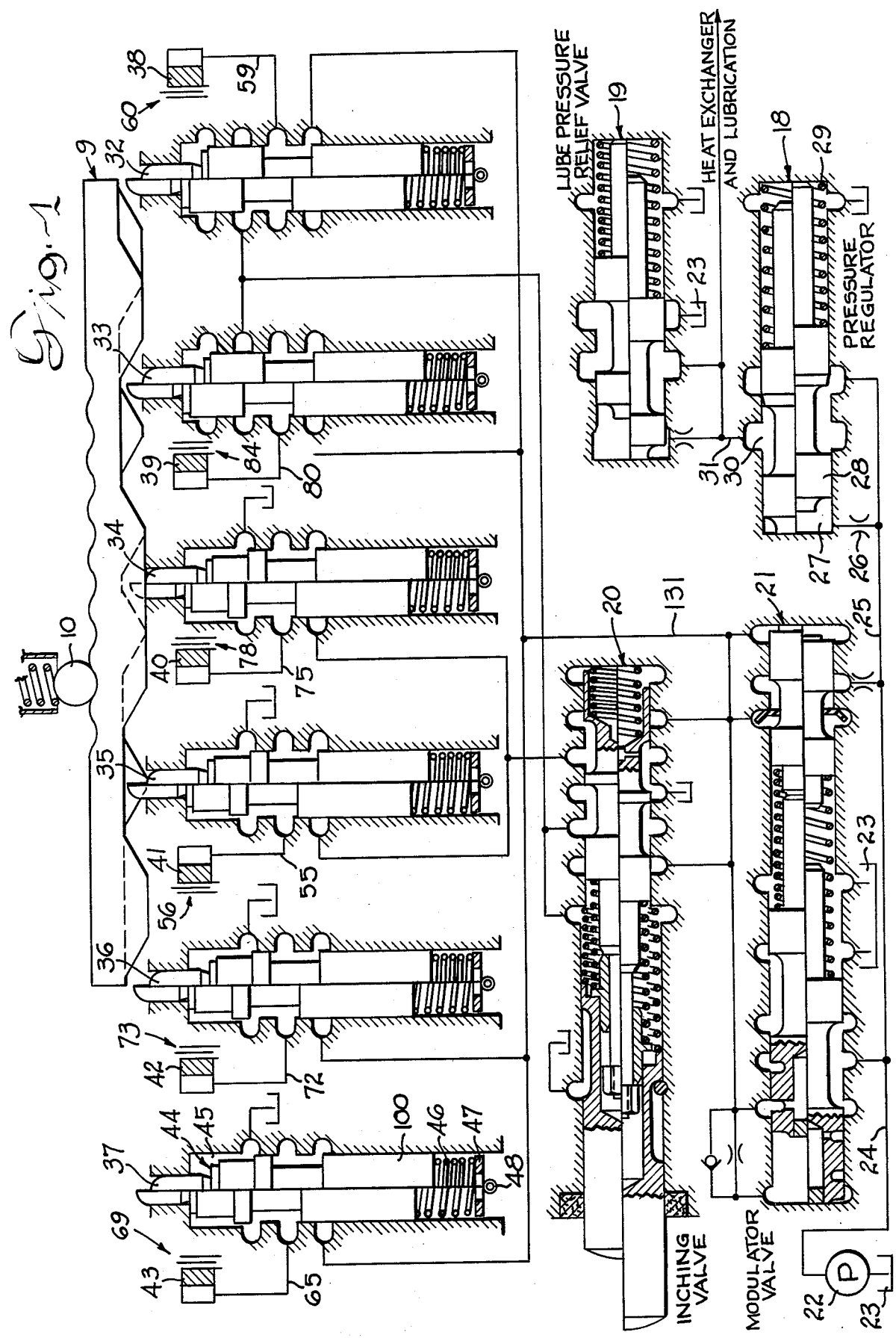

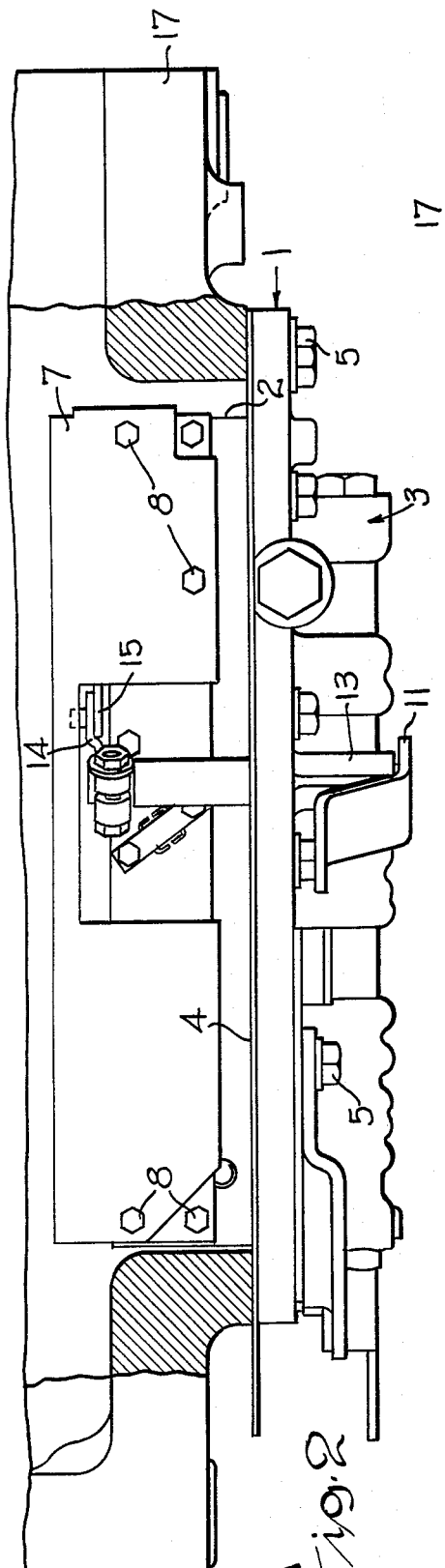
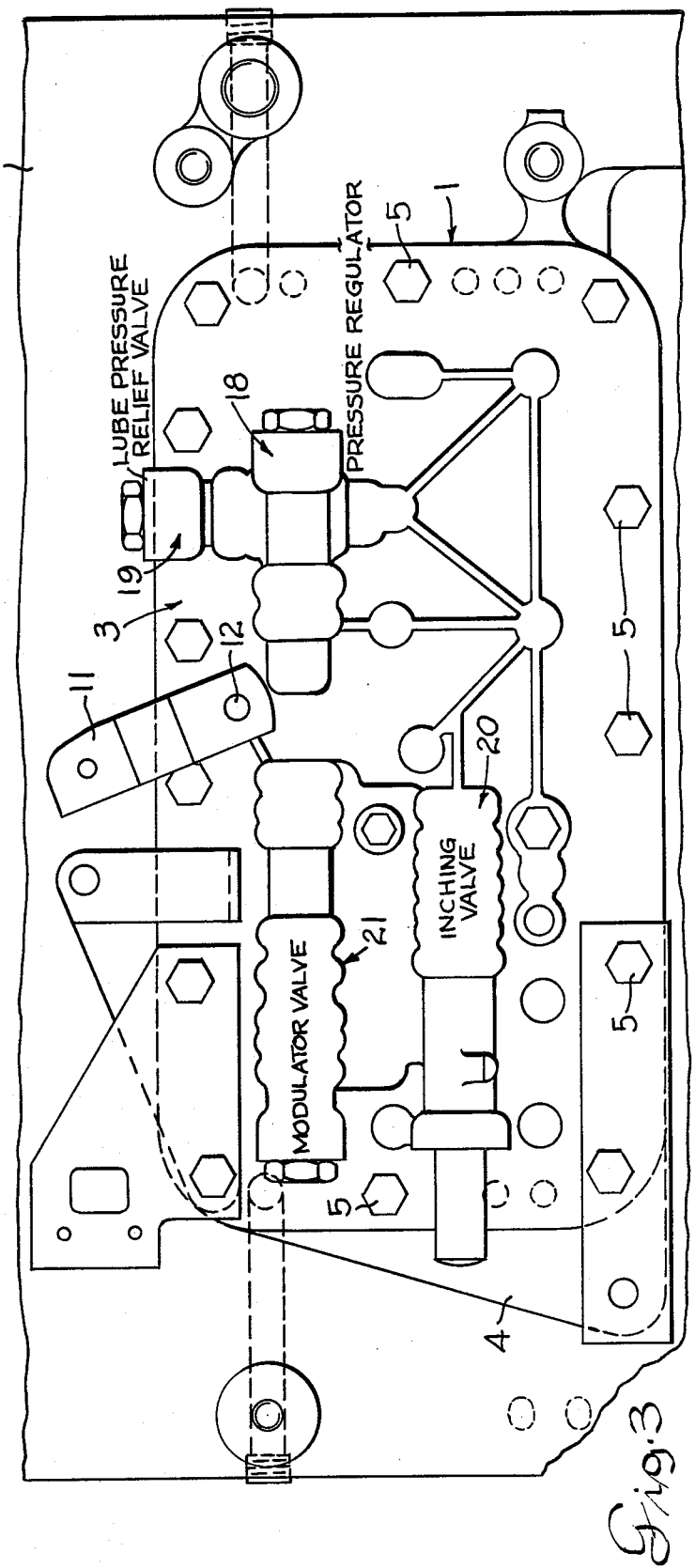

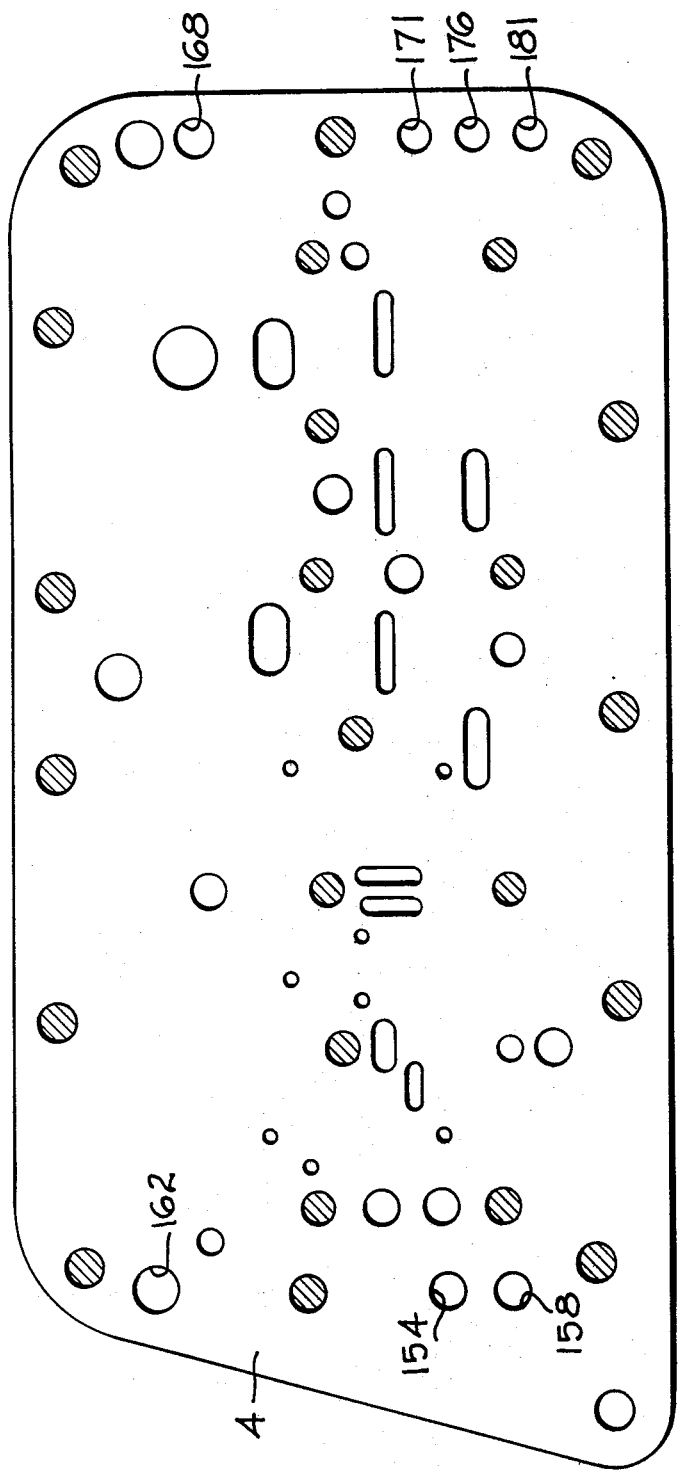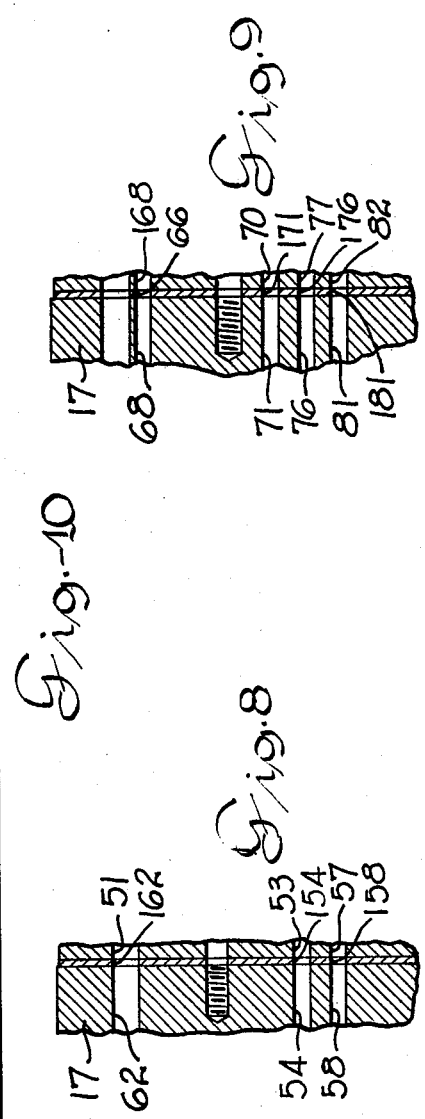

POWER SHIFT TRANSMISSION WITH REPLACEABLE CONTROL UNIT

This invention relates to a vehicle transmission and more particularly to a power shift transmission mounted within a transmission housing in combination with a hydraulic fluid system for operating the transmission. The housing has an opening for receiving the control unit when the control unit is assembled on the transmission. The opening provides for an inspection window when the control unit is removed for convenience in servicing of the power shift transmission and the integral control unit is replaceable by another unit to provide convenience and rapid servicing for the power shift transmission and the control unit.

A power shift transmission is operated by hydraulic means. Accordingly, the control system is a hydraulic system with suitable hydraulic lines connecting the control valves for operating the hydraulic actuators for selectively engaging the clutches in the power shift transmission. The conventional power shift transmission includes control valves which are selectively operated through external plumbing to the power shift transmission. External plumbing may be provided with rubber hoses or metal tubing to convey a hydraulic fluid at high pressures to the hydraulic clutches in the power shift transmission. Not only is there the danger of the external plumbing becoming damaged since it is positioned on the outside of the vehicle, but it also accumulates dirt and is difficult to keep clean and serviced. Servicing of the power shift transmission may require visual inspection and minor adjustments to assure that the transmission is operating properly and if any major repairs are required, it often can be determined by a cursory visual inspection of the transmission. Accordingly, this invention provides for an integral control unit which includes the flow control and pressure control valves which control the modulation of the pressure to the hydraulic actuators in the power shift transmission and the direction of flow of hydraulic fluid in the transmission as the clutches are engaged and disengaged. The integral control unit includes all the controls which operate the power shift transmission and the plumbing for the integral control unit is within the valve assembly to provide a very compact unit which can be easily mounted and removed on the transmission housing if necessary. Similarly, internal plumbing is used in the transmission housing which connects the hydraulic actuators in the power shift transmission to ports on the surface for mounting of the integral control unit. As the control unit is mounted on the housing, coupling is automatically provided between the transmission and the control unit. Accordingly, the whole system provides a convenience in operating, servicing and providing long life for the components in the power shift transmission and control unit.

Accordingly, it is an object of this invention to provide a power shift transmission with a replaceable control unit mounted on the power shift transmission housing.

It is another object of this invention to provide a power shift transmission housing defining an opening for receiving and mounting an integral control unit for the transmission which is removable to provide an inspection window for the transmission for adjusting and servicing of the transmission.

It is a further object of this invention to provide a control unit having internal plumbing for use with a power shift transmission and which is replaceable with another control unit. The control unit is coupled with the power shift transmission which also has internal plumbing in the transmission housing which automatically couple and decouple as the control unit is mounted or dismounted on the transmission housing.

The objects of this invention are accomplished with a power shift transmission mounted within the housing which forms an opening for receiving an integral control unit. The control unit is mounted on a mounting surface on the transmission housing and extends into the opening to a position on the side of the transmission housing for convenient operation. The integral control unit has internal plumbing and the transmission housing is also provided with internal plumbing with a port means on the mounting surface for selectively coupling and decoupling of the integral control unit with the power shift transmission when mounting or dismounting of the integral control unit on the transmission. Accordingly, the pressure and flow control valves are mounted within the control unit for selectively controlling the flow and the pressure of the hydraulic fluid to the hydraulic actuators in the power shift transmission. Modulation of the fluid during engagement and disengagement of the clutches is controlled in the valves to assure smooth engagement and disengagement of the clutches as the power shift transmission is shifted from one gear ratio to another.

Referring to the drawings, the preferred embodiment of this invention is illustrated:

FIG. 1 illustrates the control valves for controlling the flow and pressure in the hydraulic system of a transmission;

FIG. 2 illustrates a plan view of the integral control unit with a portion of the transmission housing cut away to show the mounting on the power shift transmission;

FIG. 3 illustrates the external side elevation view of the integral control unit mounted in a transmission housing;

FIG. 8 is a cross-section view taken on the plane of section VIII—VIII of FIG. 6 and showing the transmission housing and integral control unit;

FIG. 9 is a cross-section view taken on the plane at line IX—IX of FIG. 6 and showing the transmission and integral control unit;

FIG. 10 is a view taken on line X—X of FIG. 4; and

Figure 4:
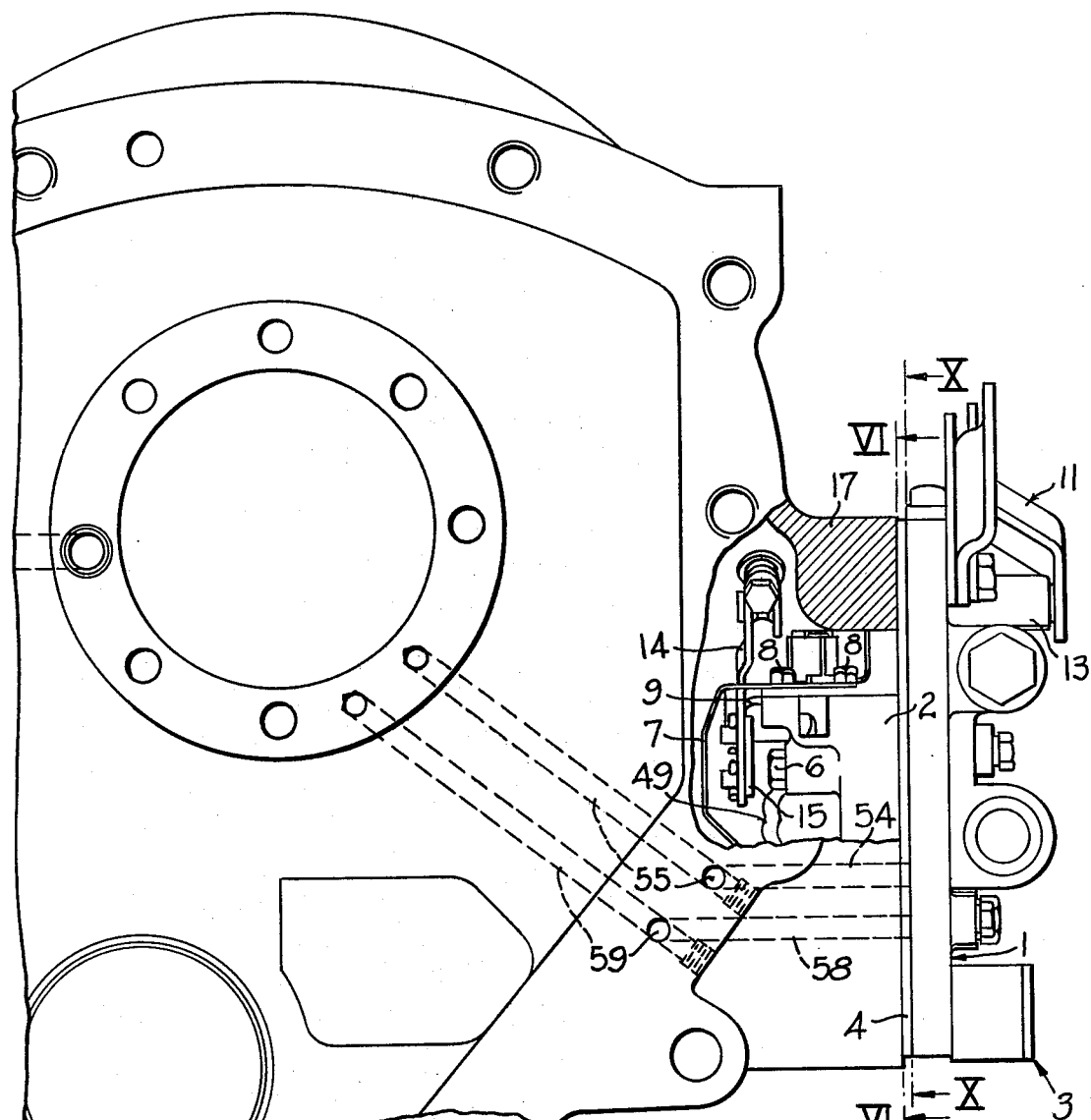
FIG. 4 illustrates an end view of the integral control unit with a portion of the main transmission housing broken away and internal plumbing in the transmission housing.
Figure 5:
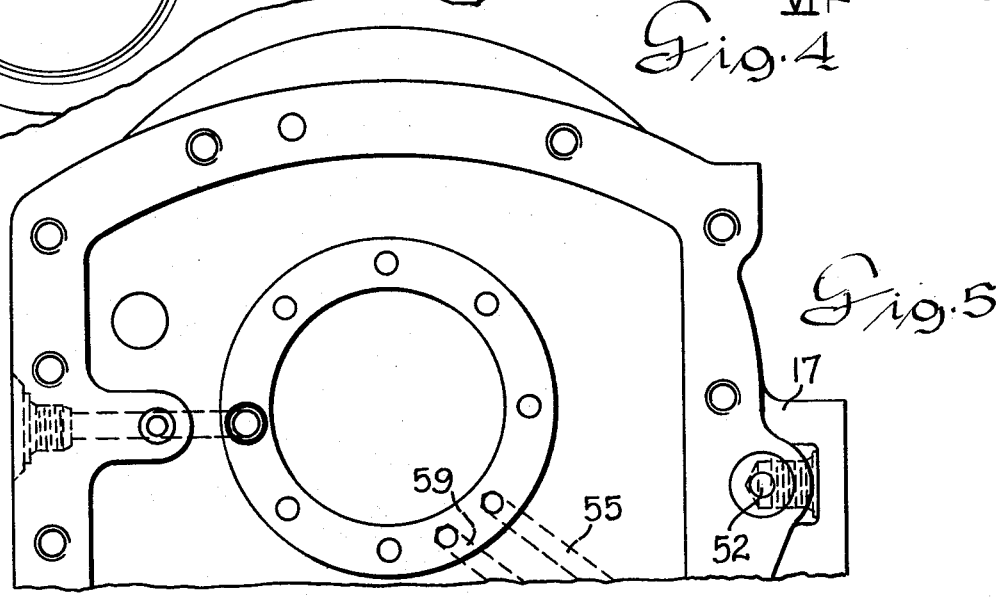
FIG. 5 illustrates a similar view of the power shift transmission showing internal plumbing in the main transmission housing.
Figure 6:
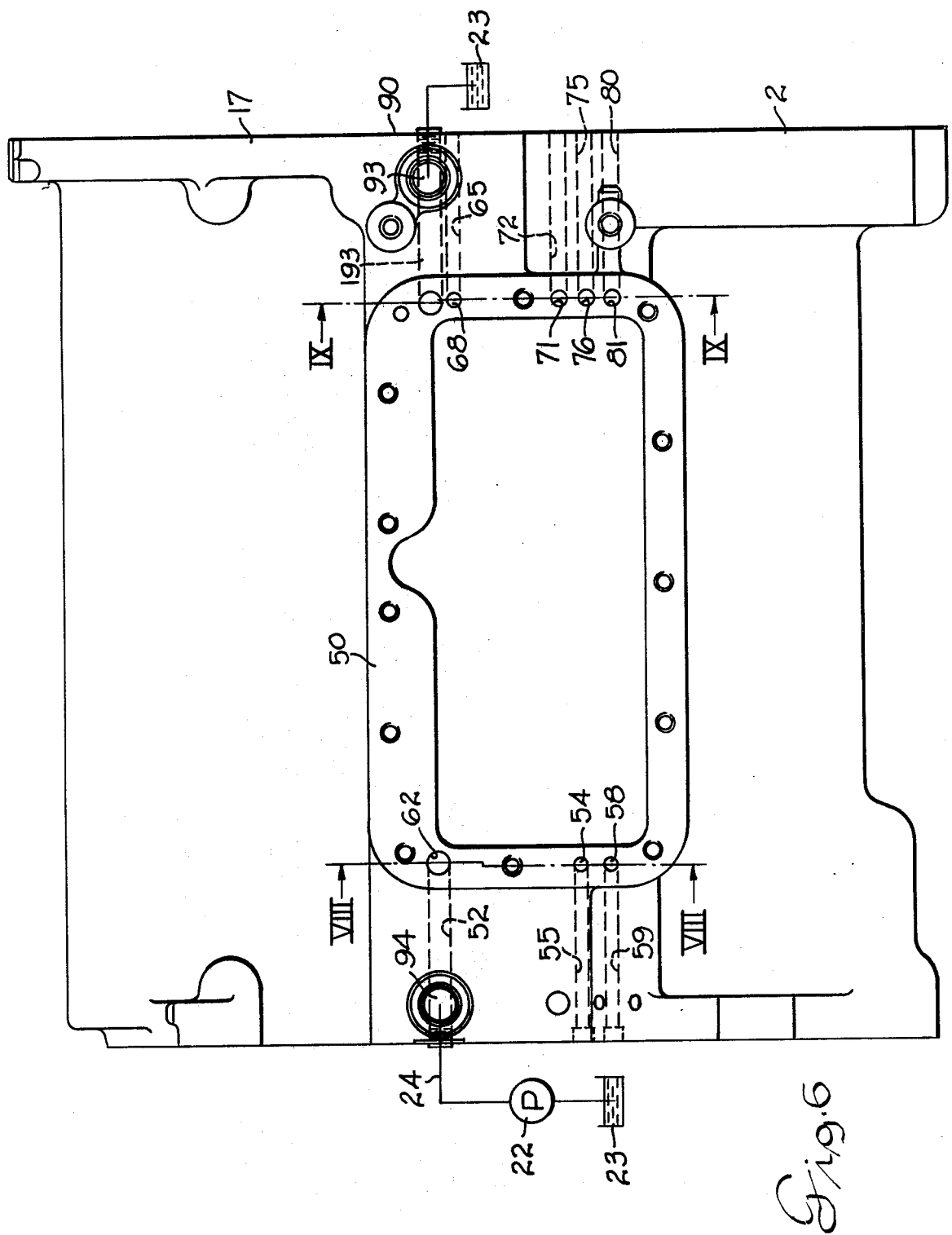
FIG. 6 is a view taken on line VI—VI of FIG. 4 showing the main transmission housing and internal passages with the integral control unit removed.
Figure 7:
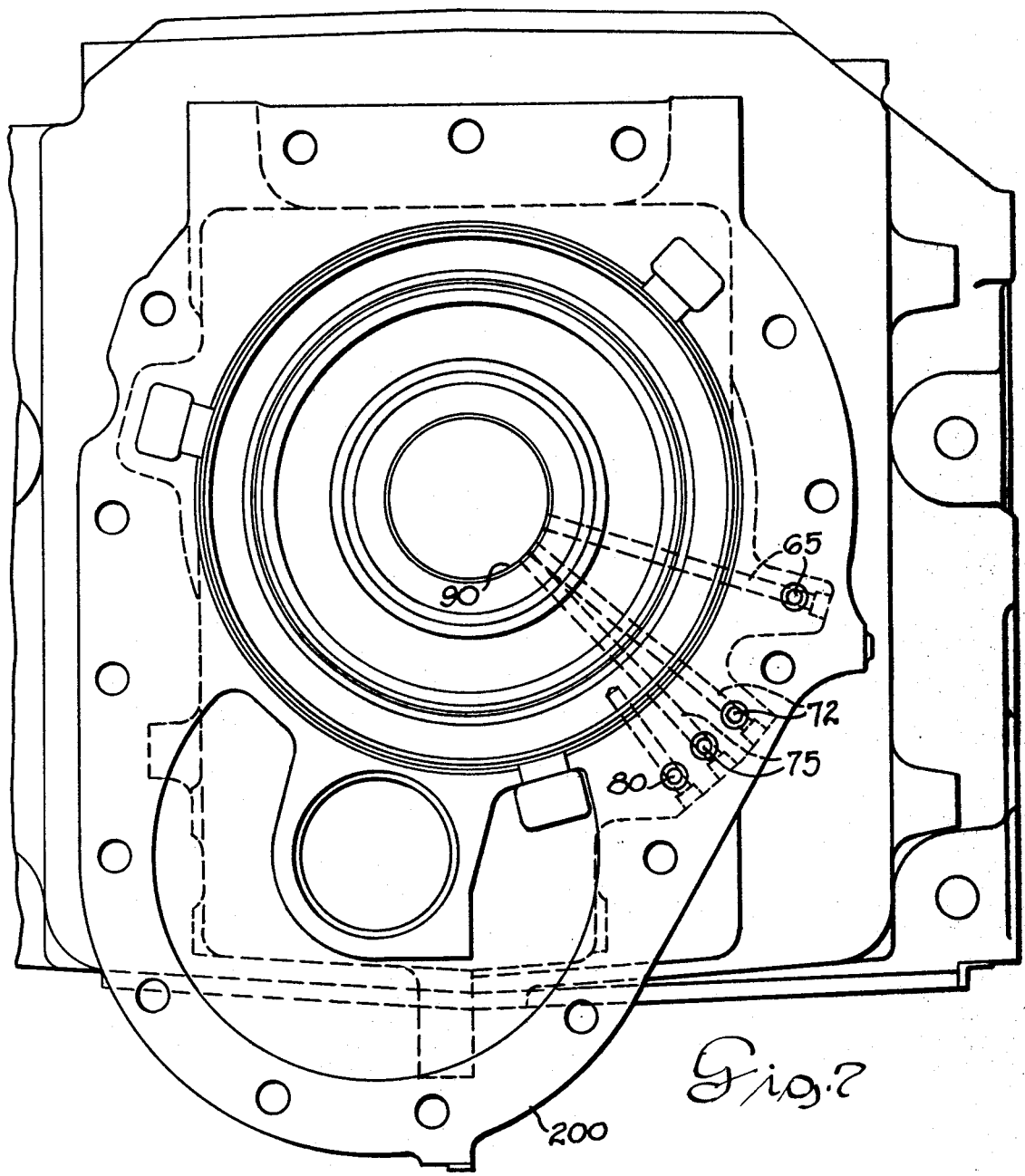
FIG. 7 is an end view of the front transmission housing showing internal passages in the front transmission housing.

Referring to the drawings, FIG. 1 illustrates the hydraulic circuit in the integral control unit with control valves and the connecting passages which are formed in the integral control unit.

The integral control unit is shown in FIGS. 2, 3 and 4. The control unit 1 is essentially a valve assembly including a valve body 2 and a valve cover 3 with a separator plate 4 sandwiched between the two and fastened together by a plurality of bolts 6 of which one is shown in FIG. 4 and also the bolts 5 on the outside of the valve cover which are shown in FIGS. 2, 3 and 4 for fastening to the transmission housing.

The valve body 2 carries a shield 7 which is fastened by a means of a plurality of bolts 8. The valve body 2 carries a reciprocating rack 9 forming cam surfaces and retained in a selected position by the detent 10. The plurality of positions are shown on the cam as they engage the detent to provide six speeds forward, a neutral and a reverse position.

A control lever 11 is pivotally mounted on the shaft 12 which is pivotally supported in the bearing 13 formed in the valve cover 3. The shaft 12 extends through the valve cover and is supported on the valve body 2. The shaft carries the control arm 14 which is pivotally connected to the link 15 which in turn is pivotally connected to the rack 9. As the control lever 11 is pivoted, the arm 14 pivots which in turn reciprocates the rack 9 and shifts the power shift transmission 201 by actuating flow control valves. The separator plate 4 is integrally fastened between the valve cover 3 and valve body 2 and fastened by a plurality of bolts 6 which extend through the separator plate 4 and valve cover 3 and threadedly engage the main transmission housing 17. The valve cover 3 is preferably of cast construction forming openings to receive the pressure regulator valve 18 and the lubrication pressure relief valve 19 as well as the inching valve 20 and the modulating valve 21. Connecting passage means are provided in the valve assembly as shown in FIG. 1. The pump 22 draws fluid from the reservoir 23 and pressurizes fluid in the passage in the conduit 24. The conduit 24 is connected to the passages in the integral control unit 1. The pressure from the pump 22 is regulated by the pressure regulator valve 18 and peak pressures are limited by the lubrication pressure relief valve 19. Normally, the pressure in conduit 24 flows through the passage 25 through orifice 26 to the chamber 27 and biases the spool 28 against the spring 29 to a normal operating position. Pressurized fluid passes through the chamber 30 and conduit 31 to the heat exchanger and lubrication system. If the pressure in the system rises above a predetermined level, pressurized fluid is vented to sump 23 through the lubrication relief valve 19.

The modulator valve 21 is normally in the right-hand position as shown in the upper half of the valve. In this position, pressurized fluid is allowed to flow through the valve to the passage 131 and on to the flow control valves 32, 33, 36 and 37.

The flow control valves are operated by the rack 9 having cam surfaces for selectively opening and closing of the valve. The modulator valve is connected through the connecting passages through the flow control valve. The flow control valves 32, 33, 34, 35, 36 and 37 are connected to the hydraulic actuators 38, 39, 40, 41, 42 and 43, respectively. When a cam surface of the rack 9 depresses one of the flow control valves, pressurized fluid supplied to the flow control valve is substantially reduced by the left-hand portion of the modulator valve and the pressure then gradually rises as the fluid is supplied to the mating hydraulic actuator and the clutch is engaged. Simultaneously, another flow control valve is being closed and the hydraulic fluid from its mating hydraulic actuator is being vented to sump. The rate of discharge of the hydraulic actuator is metered by a dashpot 44 as shown in the valve 37 which is formed in each of the flow control valves. The dashpot 44 restricts the rate of discharge of the chamber 45 and the upward movement of the valve spool 100 in response to the biasing force of the spring 46 which is mounted on the washer 47 and retained by the pin 48.

Similarly, the inching valve 20 is a manually operated pressure modulating means which modulates the pressure of hydraulic fluid to the flow control valves 34 and 35. The modulated fluid is supplied to the flow control valve in which the mating clutch is being engaged through a hydraulic actuator.

Disengagement of the clutches is controlled by a dashpot 44, which is formed in the other flow control valve. For a more complete illustration and description of the operation of the hydraulic system, reference may be had to the description in the co-pending patent application of the same inventor, Ser. No. 710,908, entitled Hydraulic Control System for Power Shift Transmission.

As previously indicated, the flow control valves are positioned in the valve body 2. The casing 49 for the flow control valve is shown in FIG. 4 in which the valves are staggered and cam surfaces of rack 9 operate the valves. Passages as shown in FIG. 1 interconnect the flow control valves and also interconnect the inching valve, modulator valve, pressure relief valve and regulator valve 18 in the valve cover. The valve assembly forms the integral control unit 1. This unit is readily removable from the transmission housing 17 by removal of the bolts 5 and can be readily replaced with an identical unit for repair of the valve assembly and continued operation of the transmission.

The integral control unit is mounted on a mounting surface 50 when the integral control unit is mounted on the mounting surface 50 and bolted by a plurality of bolts 5, and the passages in the transmission housing 17 are automatically coupled to the internal passages in the integral control unit 1.

FIG. 8 shows a section through the mounting surface of the transmission housing 17. The conduit 24 is connected through port 94 to the passage 52 which in turn is connected to the port 62. The port 62 is in communication with opening 162 in the separator plate and is also in communication with the passage 51 when assembled as shown in FIG. 8. Similarly, the passage 55 is connected through the port 54 in the power shift transmission to the passage 53 through opening 154 in the separator plate. The passage 55 leads to the hydraulic actuator 41 in clutch 56. Similarly, the passage 59 leads through port 58 in the transmission housing and opening 158 in the separator plate 4 to the passage 57 in the integral control unit. The passage 59 leads to the hydraulic actuator 38 in the clutch 60. As the integral control unit 1 is assembled on the transmission housing and bolted to the mounting surface 50, the interconnecting passages in the integral control unit are automatically coupled to the mating passages 52, 55 and 59 in the transmission housing as shown in FIG. 8.

FIG. 9 also shows a cross-section view through the mounting surface 50. Passage 65 in the front transmission housing 200 is connected through passage 68 in the main transmission housing 17 and opening 66 in the separator plate and the passage 168 in the integral control unit 1. Passage 65 in the power shift transmission leads to the hydraulic actuator 43 in the clutch 69. The passage 72 in the front transmission housing 200 is connected through the passage 71 in the main transmission housing 17 and opening 171 in the separator plate through the passage 70 in integral control unit 1. Passage 72 is connected to the hydraulic actuator 42 in the hydraulic clutch 73. The hydraulic passage 77 in the integral control unit is connected through opening 176 in the separator plate to the passage 76 in the main transmission housing and the hydraulic passage 75 in the front transmission housing 200 of the power shift transmission which in turn is connected to the hydraulic actuator 40 in the hydraulic clutch 78. The hydraulic passage 82 in the integral control unit is connected through opening 181 in the separator plate and the passage 81 through the passage 80 in the front transmission housing of the power shift transmission which in turn is connected to the hydraulic actuator 39 in the hydraulic clutch 84. The passages 65, 72 and 75 in the power shift transmission lead from the ports at the mounting surface 50 through the housing and radially inward to a bearing surface 90 and through suitable passage structure in the clutch carrier 91 to the mating hydraulic actuator in the clutch carrier. The passages in the integral control unit which are interconnected to the valves in the control unit are aligned in such a manner with the passages in the transmission housing so that when the integral control valve is assembled, the passages are automatically coupled. The sump 23 is connected to the port 93 and passage 193 while the pump 22 is connected to the port 94 and passage 52.

Figure 11:
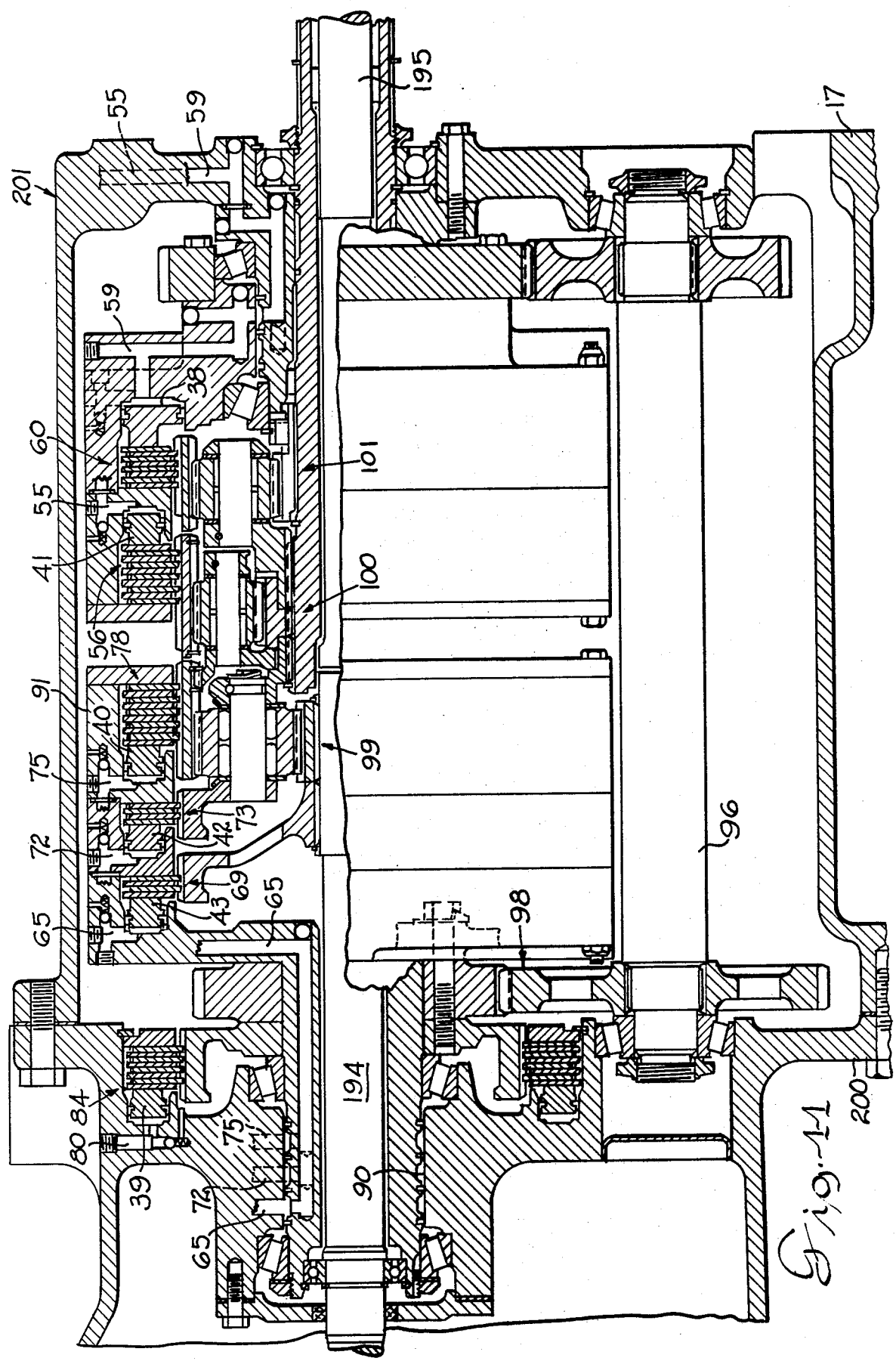
FIG. 11 illustrates a cross-section view showing a power shift transmission and internal plumbing in the transmission housing with connections to the hydraulic actuators in the power shift transmission.

The power shift transmission is shown in FIG. 11. The input shaft 194 selectively drives through the countershaft 96 or directly to the output shaft 195. The power shift transmission selectively drives through the countershaft gearset 98 or one of the planetary gearsets 99, 100 or 101. A more complete illustration and description of the power shift transmission may be had by reference to U.S. Pat. No. 3,929,037, James E. Marsh.

The power shift transmission operates in the following described manner. The integral control unit 1 includes the flow control valves mounted in the valve body 2 and the pressure control valves including the modulator valve, the inching valve, the lubrication pressure regulator valve and the lubrication pressure relief valve. The integral control unit 1 is removable and replaceable by a similar unit for quick servicing or repair.

The power shift transmission 201 and the integral control unit 1 receive pressurized fluid from a pump 22 which is external of the control unit 1 or the transmission 220. The pressurized fluid from the pump 22 is applied to a passage in the main transmission housing 17. Internal passages in the transmission housings 17 and 200 and the control unit 1 direct the fluid through the system. The pressure control valves and the flow control valves selectively direct the fluid at a modulated pressure to actuate the hydraulic actuators in the clutches of the transmission. The integral control unit 1 is mounted on a mounting surface 50 of the power shift transmission 200. A portion of the integral control unit 1 extends into an opening in the main transmission housing 17 and when the integral control unit is removed, the opening in the housing of the power shift transmission 201 operates as an inspection window. This provides a convenient means of viewing the various components of the power shift transmission 201 and to see if the transmission is in good working condition. Whether adjustments need be made or if extensive service is required, this can usually be determined by visual inspection of the power shift transmission through the inspection window. The integral control unit 1 can readily be removed from the main transmission housing 17 and can be replaced by another unit while the first unit may be repaired in the shop. This assures the continued operation of the power shift transmission with a minimum of downtime. In the process of removing or remounting of the integral control unit, the hydraulic passages provide internal plumbing in the integral control unit as well as the power shift transmission and are automatically decoupled or coupled as the unit is removed or replaced on the transmission housing 17.

Coupling and decoupling of the hydraulic conduits can be time consuming and can present seal problems which are all eliminated by this means of assembly and disassembly of the transmission and its control unit. Accordingly, the compact arrangement of the pressure control valves and the flow control valves in separate parts of the integral control unit also improve the serviceability of the unit.

The embodiments of the invention in which an exclusive property or privilege is claimed are defined as follows:

1. A power shift transmission and control system comprising, a drive shaft, a driven shaft, a plurality of gears providing a predetermined number of gear ratios and power paths through the transmission from the drive shaft to the driven shaft, a plurality of hydraulic clutches each including a hydraulic actuator for selectively engaging drive through said transmission in each of said gear ratios, a transmission housing supporting said transmission and defining an inspection opening for viewing internal components in the transmission from the side of the vehicle and a mounting surface on said transmission housing for removably mounting of an integral transmission control unit, said integral transmission control unit including a control mechanism having a portion extending externally of said control unit for manual operation, a valve assembly with flow control valves operated by said control mechanism said control mechanism including a mechanical valve actuator directly engaging said flow control valves for selectively operating said hydraulic actuators in said hydraulic clutches for shifting said transmission, pressure control valves for regulating pressure applied to the flow control valves and modulating the fluid pressure applied to the hydraulic actuators in the hydraulic clutches as the clutches are engaged, an inching valve for manually modulating pressure applied to the flow control valves and modulating the fluid pressure applied to the hydraulic actuators in the hydraulic clutches as the clutches are engaged, a valve cover housing mounting and hydraulically coupling said integral transmission control unit on said transmission housing and closing said opening in said transmission housing while mounted on said mounting surface and hydraulically decoupling said integral transmission control unit from said transmission permitting visual inspection of internal components of said transmission when said integral transmission control unit is removed, port means in said transmission housing in said mounting surface of said transmission, transmission passage means in said power shift transmission connected between said hydraulic actuators and said port means, control unit passage means providing connecting passages in said control unit connecting the pressure control valves and the flow control valves to said port means when said integral control unit is mounted on said transmission housing.

2. A power shift transmission and control system as set forth in claim 1 including passage means in said control system adapted for connection to a hydraulic pump, reservoir passage means in said hydraulic system adapted for connection to a fluid reservoir.

3. A power shift transmission and control system as set forth in claim 1 including means defining said mounting surface on said transmission housing around said opening.

4. A power shift transmission and control system as set forth in claim 1 wherein said transmission includes a clutch carrier defining at least one hydraulic cylinder each receiving a piston forming a hydraulic actuator, passage means in said clutch carrier connected to said passge means in said transmission housing for actuating one of said hydraulic actuator.

5. A power shift transmission and control system as set forth in claim 1 wherein said integral control unit defines openings connected to said control unit passage means to thereby provide a sealed coupling between said ports and openings at said mounting surfaces when said integral control unit is mounted on said transmission housing.

6. A power shift transmission and control system as set forth in claim 1 wherein said transmission passage means includes a rotating clutch hub defining at least one of said hydraulic actuators and hub passage means, housing passage means connected between said hub passage means and said port means.

7. A power shift transmission and control system as set forth in claim 1 including a sealing surface formed on said integral control unit opening means in said sealing surface connected to said control unit passage means, said transmission housing defining said port means for sealing said opening means and said port means when said integral control unit is mounted on said transmission housing.

8. A power shift transmission and control system as set forth in claim 1 including means defining said mounting surface and said opening for receiving said integral control unit on the side of said transmission housing to permit visual inspection of the side of said power shift transmission when said integral control unit is removed.

9. A power shift transmission and control system as set forth in claim 1 wherein said integral control unit includes a valve body and a valve cover integrally fastened together, means for fastening said valve cover on said transmission housing for covering said opening and for receiving said valve body in said opening.

10. A power shift transmission and control system as set forth in claim 1 wherein said transmission defines a housing structure defining said mounting surface for said integral control unit, bearing surfaces for rotatably supporting components of said power shift transmission, said transmission passage means connecting said port means on said mounting surface with said bearing surfaces in said transmission for conveying pressurized fluid from said integral control unit to said hydraulic actuators.

* * * * *